US006690358B2

United States Patent
Kaplan

(10) Patent No.: US 6,690,358 B2
(45) Date of Patent: Feb. 10, 2004

(54) DISPLAY CONTROL FOR HAND-HELD DEVICES

(76) Inventor: Alan Edward Kaplan, 9 Cromwell Dr., Morris Township, NJ (US) 07960

( * ) Notice: Subject to any disclaimer, the term of this patent is extended or adjusted under 35 U.S.C. 154(b) by 469 days.

(21) Appl. No.: 09/726,894

(22) Filed: Nov. 30, 2000

(65) Prior Publication Data

US 2002/0093483 A1 Jul. 18, 2002

(51) Int. Cl.[7] .................................................. G09G 5/08
(52) U.S. Cl. ........................................ 345/158; 345/649
(58) Field of Search ................................ 345/156, 158, 345/649, 157

(56) References Cited

U.S. PATENT DOCUMENTS

| 5,602,566 | A | * | 2/1997 | Motosyuku et al. | ......... 345/684 |
| 6,201,554 | B1 | * | 3/2001 | Lands | ......... 345/169 |
| 6,400,376 | B1 | * | 6/2002 | Singh et al. | ......... 345/685 |
| 6,466,198 | B1 | * | 10/2002 | Feinstein | ......... 345/158 |
| 6,567,068 | B2 | * | 5/2003 | Rekimoto | ......... 345/156 |
| 6,567,101 | B1 | * | 5/2003 | Thomas | ......... 345/649 |

* cited by examiner

*Primary Examiner*—Bipin Shalwala
*Assistant Examiner*—Ricardo Osorio
(74) *Attorney, Agent, or Firm*—Henry T. Brendzel

(57) ABSTRACT

A special orientation sensor within a hand-held electronic computing device provides for movement of a screen cursor in response to changes in the spatial orientation of computing device. The sensor provides at least two output signals that are sensitive to gravitational force in at least two different directions, and those signals assist in determining the spatial orientation of the computing device and in determining the position of cursor 120. In one illustrative embodiment the force-sensing mechanism comprises a pair of accelerometers that provide a signal corresponding to the gravitational force applied to the accelerometers. A processor responsive to the signals of the accelerometer converts those signals to cursor position signals.

2 Claims, 3 Drawing Sheets

DISPLAY CONTROL FOR HAND-HELD DEVICES

BACKGROUND OF THE INVENTION

This invention relates to cursor control, as well as panning and scrolling in displays of hand-held devices.

In many of today's electronic computing devices, such as personal computers (PCs), portable digital assistants (PDAs), electronic games, and even cell phones include a screen display. Users communicate with the devices by receiving information via the display, and providing information through one or more input devices, which is reflected in the display. The most common input devices, as least in connection with PCs, are the keyboard and a pointing device such as a track-ball, a mouse or a joystick. Simply described, a mouse consists of a ball and case. In use, the casing is held by the operator to place the ball against a given dedicated surface, and movement of the case causes the ball to roll on the surface in any desired two-dimensional direction. The movement of the ball is encoded and communicated to the computer, which translates the ball's movement to a movement of a displayed cursor icon on the PC's screen. The mouse also includes one or more buttons that, when pushed, initiate some other action by the PC that, typically, is related to the position of the cursor when the button is pushed. The kinds of actions that are triggered includes manipulations of the displayed image through scrolling or panning.

The main drawback to the mouse device, particularly for portable devices such as PDAs and cell phones, is that it requires a dedicated, relatively flat and unobstructed area for moving the mouse around. With respect to small, portable, devices such as PDAs and cell phones, that is a major drawback. What these devices employ, therefore, is touch sensitive screens in combination with a stylus (for example, the Palm Pilot), or push buttons (for example, most cell phones). Other devices have also been proposed, such as a thumbwheel (in U.S. Pat. No. 5,590,382) and a moveable multi-position switch (in U.S. Pat. No. 4,739,128). These input devices represent an advance in the art, but when a person desired to use one handed operation, these input devices are somewhat awkward to work because the person needs to hold the electronic computing device, to operate the input device to achieve cursor control, and to push activation buttons; all with a single hand.

SUMMARY

An advance in the art is realized by providing for movement of a screen cursor in response to the spatial orientation of hand-held electronic computing devices. This is achieved with a force-sensing mechanism that is built into the electronic computing device which, by sensing the gravitational pull, assists in determining the spatial orientation of the computing device by sensing the net force that is applied thereto, and assists in determining the position of cursor 120. In one illustrative embodiment the force-sensing mechanism comprises a pair of accelerometers that provide a signal corresponding to the gravitational force applied to the accelerometers. A processor responsive to the signals of the accelerometer converts those signals to cursor position signals.

DETAILED DESCRIPTION

Figure 1:
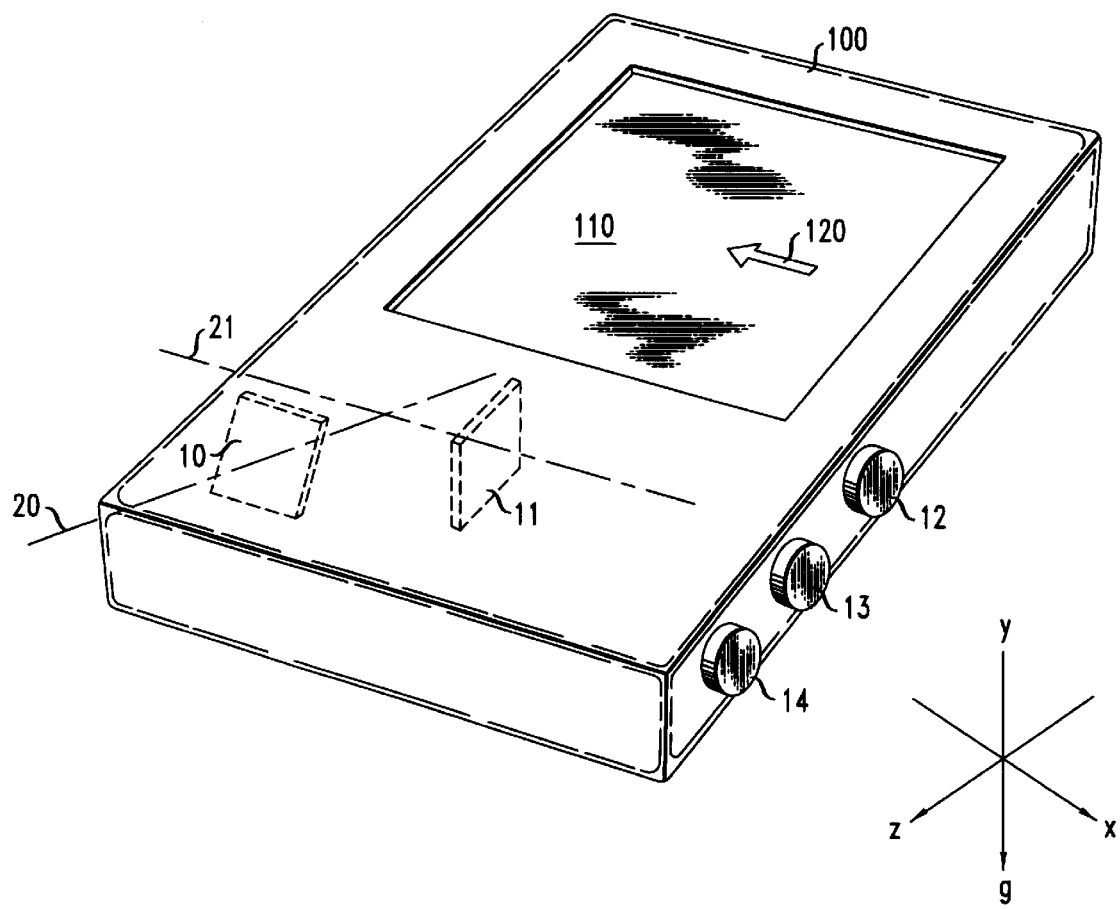
FIG. 1 illustrates a PDA that employs the principles of this invention.

FIG. 1 illustrates an electronic computing device in the form of a PDA 100 with a screen 110, on which a cursor 120 is shown to be present. PDA 100 also includes one or more activation buttons, such as buttons 12, 13, and 14. Pushing one of the buttons, or pushing a combination of those buttons enables movement of cursor 120. For example when a user of PDA 100 pushes button 13 the movement of cursor 120 is enabled. Releasing button 13 disables changes in the position of cursor 120. Correspondingly, when a user of PDA 100 pushes another button, for example button 14 (or a combination of buttons, such as buttons 13 and 14) the cursor is frozen and the display below is panned, and/or scrolled. Alternatively, the cursor is moved to the center of display screen 110 and the image of display 110 is panned, and/or scrolled.

In accordance with the principles of this invention, the position of cursor 120 is based on the forces that are applied to PDA 100. To that end, PDA 100 includes a force-sensing mechanism that, by sensing the net force that is applied to PDA 100, assists in determining the position of cursor 120. In the illustrative embodiment disclosed herein, the position of cursor 120 is made to be responsive to the detection of primarily of the gravitational force. Consequently, as it appears to the user of PDA 100, the position of cursor 120 is made to be sensitive to the spatial orientation of PDA 100 when it is essentially at rest.

Figure 2:
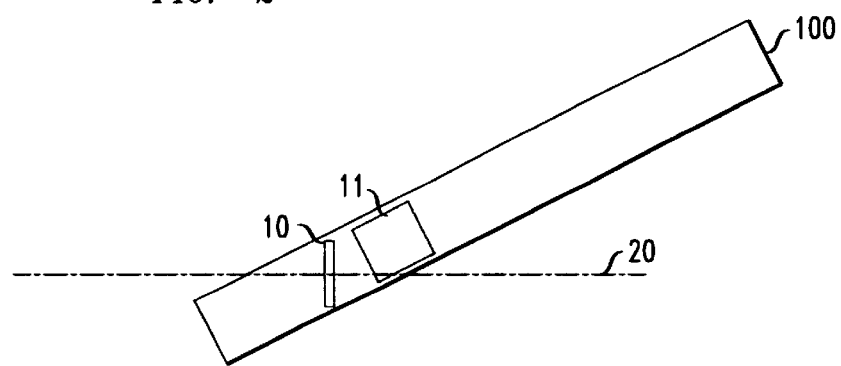
FIG. 2 presents a side view of the FIG. 1 PDA.

To achieve this result, PDA 100 includes accelerometers (or other tilt sensors) 10 and 11 that are positioned within PDA 100 in a manner not unlike the one shown in FIGS. 1 and 2, where the latter depicts the side view of PDA 100. Accelerometers 10 and 11 measure force along their respective major axes 20 and 21 and, as shown in FIGS. 1 and 2, the positioning of accelerometers 10 and 11 is such that axes 20 and 21 point at different directions. Accelerometers 10 and 20 are conventional devices that can be purchased, for example, from Analog Devices, Inc. Illustratively, axis 20 is in the horizontal plane when PDA 100 is held in a position that is tilted upwards to facilitate viewing of screen 110, say 30 degrees above the horizon, (hereinafter, the "neutral position") and is congruent with the z-axis shown in FIG. 1. Axis 21 also lies in the horizontal plane when PDA 100 is at the neutral position and is congruent with the x-axis shown in FIG. 1 The negative direction of the y-axis is marked with the letter "g" to designate its congruency with the gravitational force.

It should be noted that it is not required for axis 21 to be perpendicular to the horizon when the person holds PDA 100 at hand, nor is it required that axes 20 and 21 lie in the same plane, or that the two accelerometers output the same force signal when subjected to the same force. However, the latter two choices simplify the illustrative calculations that are presented below and are, therefore, adopted. It should be also understood that the signal corresponding to the maximum gravitational force that the accelerometers output in response to the gravitational pull (e.g., at sea level), F, is known by virtue of the manufactured parameters of accelerometers 10 and 11 or through a simple calibration step that positions PDA in a so that the axis of the calibrated accelerometer is vertical, and measures the resultant force signal.

Figure 3:
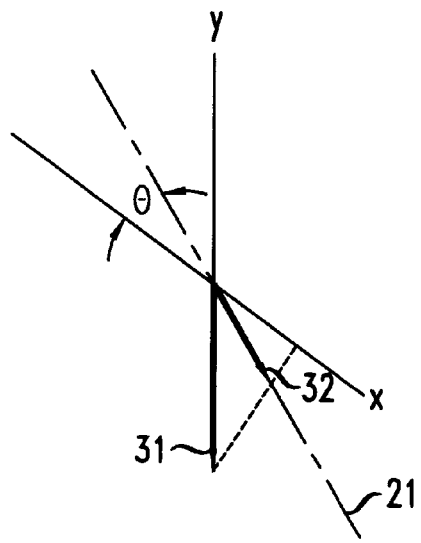
FIGS. 3 and 4 illustrates the force vectors with different orientations of the FIG. 1 PDA.
Figure 4:
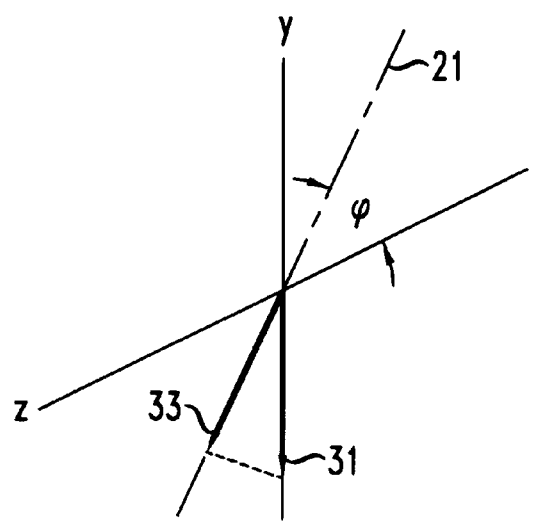

At whichever position PDA 100 is held, when the PDA is not subjected to acceleration induced by the holder (i.e., the PDA is at rest), at least one, and typically both, accelerometer 10 and accelerometer 11 provide a non-zero force signal that corresponds to that portion of the force of gravity that runs along axes 20 and 21, respectively. Both accelerometers, however, do provide a zero force signal at the neutral position because at the neutral position both axes 20 and 21 are orthogonal to force g. More specifically, the signal that each accelerometer outputs is related to the angle of the accelerometer's major axis away from the horizontal plane. FIG. 3 illustrates the force signal of accelerometer 11 when it is rotated 90° about axis z from its neutral position with vector 31, and the force signal of accelerometer 11 PDA 100 is rotated clockwise about axis z by an angle $\theta$ from its neutral position. Vectors 31 and 32 lie in the x-y plane and, therefore, FIG. 3 omits showing axis x. It can easily be seen that if force signal 31 is equal to F, then force signal 32 is equal to $F_{11}=F \sin \theta$. Since the there is no rotation of axis 20, the force signal of accelerometer 10 remains equal to 0. Correspondingly, when PDA 100 is elevated to a larger angle relative to the horizon with vector 32, accelerometer 10 outputs a force signal $F_{10}=F \sin \phi$, where $\phi$ is the rotation angle about the x-axis (above the neutral position). It may be noted that the arrangement of axes 20 and 21 provides the greatest sensitivity to positional changes in PDA 100.

Of course, accelerometers 10 and 11 are responsive to all forces, and not just to gravitational force. That includes the force that the user applies in the course of changing the position and/or orientation of PDA 100. In accordance with the principles of the illustrative embodiment, the intent is for cursor 120 to be responsive to the orientation of PDA 100 rather than to the movement from one orientation to the next. That means that whatever processing is performed to translate the orientation of PDA 100 to a position of cursor 120, any perturbations that might result from the act of movement, or the act of reorientation, of PDA 100 need to be removed from the final position determination. In other words, it is desired for the processing of the cursor 120 position to be responsive to the final, rest, position of PDA 100. That is not to say that the position of cursor 120 cannot move at all in response to the acceleration that is associated with the movement or reorientation of PDA 100 from one position to the next. However, minimizing this movement is advantageous. To that end, my illustrative embodiment includes low pass filtering, with a low-pass band cutoff frequency as chosen by the practitioner, for example, 10 to 20 Hz. Of course, most artisans would recognize that the low pass filter can be implemented in processor 17.

Figure 5:
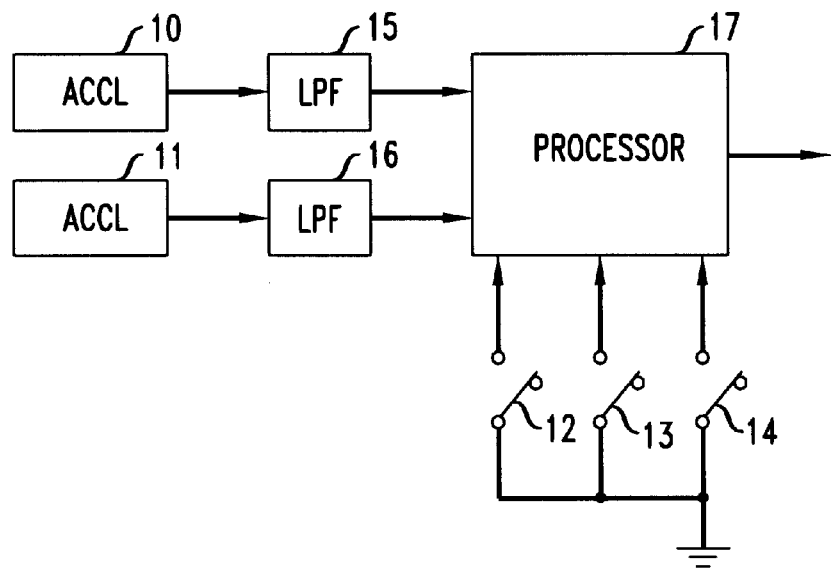
FIG. 5 presents a block diagram of the processing arrangement for controlling the position of curser 120.

FIG. 5 presents a block diagram of the arrangement for processing the force signals of accelerometers 10 and 11. It includes low pass filters 15 and 16 that are respectively responsive to accelerators 10 and 11, and a processing element 17 that is responsive to the output signals of filters 15 and 16 and to switches 12–14. Element 17 can be a conventional stored program controlled microprocessor that computes the orientation of element 17. More specifically, my illustrative embodiment determines the orientation of PDA 100 with respect to the angle that PDA 100 makes with the z-x plane (the horizontal plane), i.e, the angle $\theta$, which corresponds to $\sin^{-1}(F_{11}/F)$; and the angle that PDA 100 makes with respect to the z-y plane ("roll" in the aeronautical sense), i.e., the angle $\phi$, which is $\sin^{-1}(F_{10}/F)$.

Processing element 17 is charged with responsibility for computing $\theta$ and $\phi$, which can be done with a simple look-up table, and can also be charged with the task of translating the computed angles to cursor 120 positions. There are, of course, many relationships that can be selected for the movement of cursor 120 in response to tilting, or rotation, of PDA 100. The one that appears to be most natural is one which treats cursor 120 almost like the air bubble in a carpenter's level. That is, a rotation of PDA 100 about the z axis by an angle $\alpha$ in the counter clockwise direction moves cursor 120 to the right on display 110 (in a PDA orientation depicted in FIG. 1), effectively forming the relationship $L=K\alpha$, K being a gain constant that has the dimensions cm/deg that can be adjusted so that a rotation by some selected angle $\gamma$ degrees about the z-axis causes the movement of cursor 120 the width of display 110. It may be noted here that the value of F need not be known with great accuracy because it basically affects the angle $\gamma$, and the precise value of $\gamma$ is not of interest. The positioning of cursor 120 on screen 110 can be easily achieved through the natural hand-eye coordination of the user.

Actually, the K is a sensitivity gain factor for the movement of cursor 120 (i.e., how many millimeters the cursor moves in response to a one degree rotation) and it can be made an adjustable variable that is stored in a memory that is associated with processing element 17. The adjustment of this variable can be achieved by enabling PDA 100 to enter a customization mode that is not unlike what is done in conventional PCs. In an embodiment where the enablement of cursor movement is effected with button 13, for example, and button 13 controls a potentiometer (rather than to a switch as shown in FIG. 5), the value of the potentiometer (not shown) can be determined by processor 17 (e.g. with a resistive bridge and a A/D converter module) and the value of the K variable can be controlled by how hard button 13 is pressed. A visual display in this customization mode informs the user of the value of K.

The above describes adjusting the gain factor during a customization process, but the adjustment of gain can be continuous as well. For example, pressing button 13 lightly enables movement of cursor 120 with a low gain factor and, therefore, fine sensitivity, while pressing button 13 harder increases the gain factor and thus reduces sensitivity. This action is akin to pressing the gas pedal on an automobile.

As indicated above, one embodiment of PDA 100 can devote button 14 to panning of the image that is shown on display 110. In a conventional PC, the panning of an image occurs in one direction at a time, by clicking on horizontal or vertical panning (or scrolling) bars. The same effect is achieved by rotating PDA 100 about the z-axis or the x-axis. Of course, the panning arrangement of PDA 100 is superior, since it easily enables panning in any direction whatsoever. As with the process of moving cursor 120, the panning process includes a gain factor, and this gain factor can be adjusted on a permanent basis, or controlled on the fly. Typically, the gain factor for panning will be greater than the gain factor for moving cursor 120.

Figure 6:
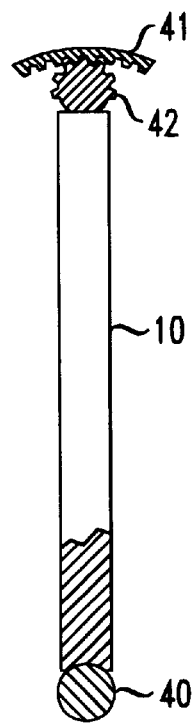
FIG. 6 shows one arrangement for adjusting the physical position of an accelerometer, such as accelerometer 10.

The above mentions that in the FIG. 1 embodiment the neutral position of PDA 100 corresponds to the position of greatest sensitivity of accelerometers 10 and 11. The neutral position doe not have to correspond to the position of greatest sensitivity of accelerometers 10 and 11, but if one wished that to be the case, then it remains that the neutral position for one user may be different from the neutral position of another user, so it is advantageous to provide a means for adjusting the spatial orientation of PDA 100 where greatest sensitivity of accelerometers 10 and 11 occurs. This can be accomplished in a myriad of conventional ways. FIG. 6 depicts one embodiment that realizes flexibility in the physical position of accelerometer 10. It includes a pivot point 40 at one end of accelerometer 10, with the other end including a worm 42 and a stationary gear section 41. A shaft that extends to the outside of PDA 100 is connected to worm 42, which permits changing the tilt of accelerometer 10 by turning the shaft, and hence worm 42, against gear 41.

The above-mentioned processing tasks of processing element 17 correspond solely to the conversion from force signals to position signals. The processing necessary to convert the position signals to a display of cursor 120 at the appropriate position is not described because it is completely conventional. The processing tasks of element 17 impose a very light computational burden on the processor and, therefore, element 17 can be easily merged with whatever other processing element exists in PDA 100. Stated in other words, in addition to computing the orientation of PDA 100 and thereby controlling the position of cursor 120, processing element 17 can also performs all other functions of PDA 100.

The principles of this invention are illustrated by the above-disclosed embodiment, but a skilled artisan would realize that different embodiments, and modifications to the disclosed embodiment could be had that comports with the principles disclosed herein.

What is claimed is:

1. Apparatus adapted to be hand-held that includes a screen comprising:

orientation sensor, developing at least two signals representative of orientation of said sensor in three dimensional space;

a processor that controls movement of said cursor in response to tilting of said apparatus;

means for coupling said signals to said processor for controlling position of a cursor on said screen; and a movement actuator coupled to said processor, said actuator being moveable from an initial position in response to an applied force, where rate of said movement of said cursor in response to said tilting is sensitive to movement of said actuator from said initial position.

2. The apparatus of claim 1 wherein said actuator is a spring-loaded push button that controls a potentiometer.

* * * * *